UNITED STATES PATENT OFFICE.

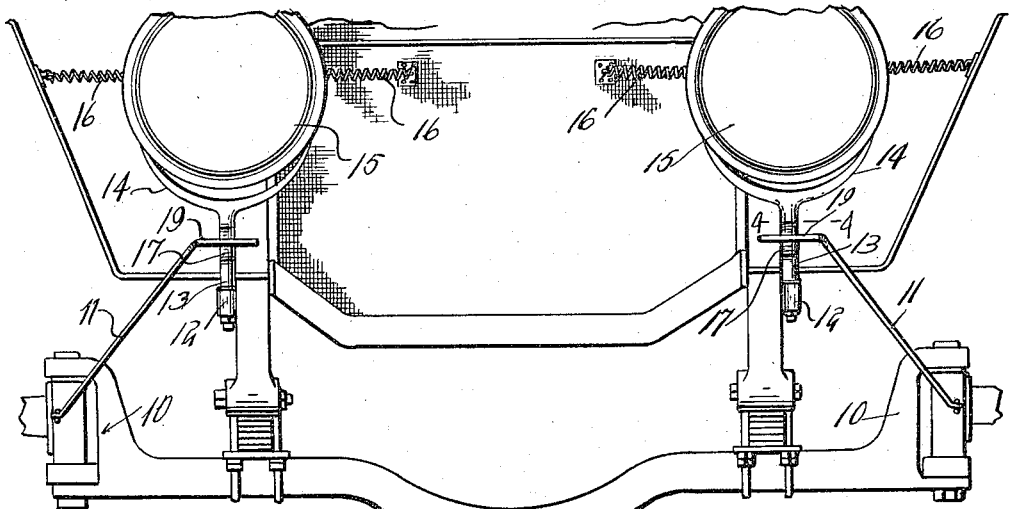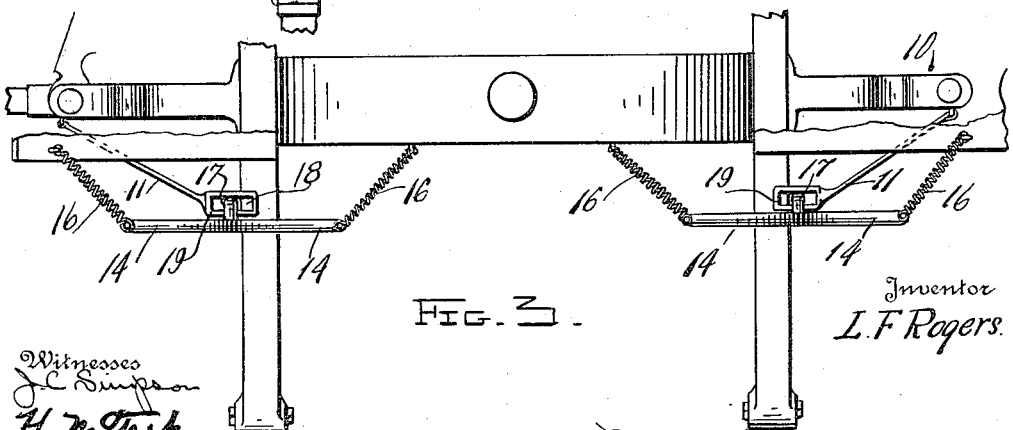

LOUIE F. ROGERS, OF KNOX, INDIANA.

HEADLIGHT FOR AUTOMOBILES.

1,175,818. Specification of Letters Patent. Patented Mar. 14, 1916.

Application filed November 10, 1915. Serial No. 60,769.

*To all whom it may concern:*

Be it known that I, LOUIE FRANCIS ROGERS, a citizen of the United States, residing at Knox, in the county of Starke, State of Indiana, have invented certain new and useful Improvements in Headlights for Automobiles; and I do hereby declare the following to be a full, clear, and exact description of the invention, such as will enable others skilled in the art to which it appertains to make and use the same.

This invention relates to improvements in headlights for automobiles.

The principal object of the invention is to provide a dirigible headlight mechanism which will not affect the turning of the lamps except when the front wheels of the automobile are turned beyond a predetermined angle, whereby the automobile can be made to swerve slightly to either side to avoid an obstruction in the road.

Other objects and advantages will be apparent from the following description when taken in connection with the accompanying drawing.

In the drawing: Figure 1 is a front elevation; Fig. 2 is a side elevation; Fig. 3 is a top plan view; and Fig. 4 is an enlarged horizontal section on the line 4—4 of Fig. 1.

Referring particularly to the accompanying drawing, 10 represents the knuckles of the front axle and 11 arms extending rearwardly therefrom, the said arms being movable with the wheel portion of the knuckles. Suitably mounted in brackets 12 are the vertical lamp posts 13, the upper ends of which are forked at 14 in the usual manner and supports the lamps 15. Springs 16 are connected to both sides of the fork and are connected at suitable points on the machine to hold the lamps in forwardly directed positions. Formed in each of the posts, intermediate its length is a crank portion 17, this crank portion being disposed through a slot 18 in a plate 19 carried by the arm 11.

When the front wheels of the automobile are turned to the right or left the arms 11 will move the plates 19, but if the wheels are only turned a short distance, as for instance in swerving to the right or left to avoid a rut or obstruction in the road, no action on the lamp post will result, by reason of the fact that the slots of the plates are formed of lengths to prevent such action. Should the wheels be turned farther, as in turning a corner, the end walls of the slots of the plates would engage with the crank portions of the lamp posts and turn them so that the light from the lamps will be directed straight ahead of the wheels. This overcomes the objection to the ordinary headlights which are turned with the steering mechanism and which turn with the front wheels no matter how narrow or how wide the turn is. It is rather disconcerting when making a sudden short swerve in the road, to have the lamps move suddenly to the right or left, and thus take the light away from the road ahead of the machine. In other words, the light is constantly shed on the road directly ahead of the machine even though the machine should swerve to the right or left side of the road.

What is claimed is:

A dirigible headlight mechanism for an automobile comprising oscillatory lamp supporting posts formed with crank portions, horizontally disposed slotted plates embracing the crank portions, operative connections between the slotted plates and the steering knuckles for oscillating the posts only after the knuckles have moved beyond a predetermined point, and resilient means for holding the lamp supporting posts in normal centered position.

In testimony whereof, I affix my signature, in the presence of two witnesses.

LOUIE F. ROGERS.

Witnesses:
FLEDA M. ROCKWELL,
A. W. SWARTZELL.

Copies of this patent may be obtained for five cents each, by addressing the "Commissioner of Patents, Washington, D. C."